Jan. 24, 1961 G. B. BROWN 2,969,036
MEANS FOR SWEEPING A MINE
Filed Oct. 25, 1945 6 Sheets-Sheet 1

Inventor
G. B. Brown
By Ralph L. Chappell
Attorney

Jan. 24, 1961    G. B. BROWN    2,969,036
MEANS FOR SWEEPING A MINE
Filed Oct. 25, 1945    6 Sheets-Sheet 2

Inventor
G. B. Brown
By Ralph L. Chappell
Attorney

Jan. 24, 1961

G. B. BROWN 2,969,036

MEANS FOR SWEEPING A MINE

Filed Oct. 25, 1945

Inventor

G. B. Brown

Jan. 24, 1961  G. B. BROWN  2,969,036
MEANS FOR SWEEPING A MINE
Filed Oct. 25, 1945  6 Sheets-Sheet 4

Inventor
G.B.Brown
By Ralph Chappell
Attorney

Jan. 24, 1961  G. B. BROWN  2,969,036
MEANS FOR SWEEPING A MINE
Filed Oct. 25, 1945
6 Sheets-Sheet 5

Inventor
G. B. Brown
By Ralph L. Chappell
Attorney

Jan. 24, 1961  G. B. BROWN  2,969,036
MEANS FOR SWEEPING A MINE
Filed Oct. 25, 1945  6 Sheets-Sheet 6

Inventor
*G. B. Brown*
By [signature]
Attorney

United States Patent Office 2,969,036
Patented Jan. 24, 1961

2,969,036

MEANS FOR SWEEPING A MINE

Graham B. Brown, 2133 Suitland Terrace SE.,
Washington, D.C.

Filed Oct. 25, 1945, Ser. No. 624,613

11 Claims. (Cl. 114—235)

(Granted under Title 35, U.S. Code (1952), sec. 266)

This invention relates to means for sweeping an underwater mine and more particularly to means for sweeping an underwater mine in which firing of the mine is accomplished by a reduction in pressure of the surrounding water.

There are a variety of principles upon which the firing of pressure actuated mines can be made to operate. The fundamental principle involved in this type of mine is that the pressure time relations at fixed points of reference beneath a moving vessel are of a more or less well defined type and a device for the successful sweeping of a pressure mine requires simulation of these pressure time relations to a sufficient degree to fire the mine. It is a further principle in the design of a pressure fired mine that it must not be fired in response to variations of pressure generated by waves, seiches or tides. As a consequence there are conditions on the pressure-time relations which will fire the mine and these conditions must be met in a successful mine sweeping device.

In accordance with the present invention a pressure signal sufficient to fire the mine is generated within the water by the movement of a large mass of water entrained within a flexible body or envelope as the body is towed beneath the surface of the water by a vessel.

The envelope is provided with an aperture at the front end thereof through which water is received. A smaller aperture is provided at the rear end of the envelope to restrict the flow of water within the envelope during the towing operation and to permit the escape of any air which may be trapped therein as the envelope is streamed from the towing vessel. The differential of the cross sectional area of the aforesaid apertures in the envelope is sufficient to maintain the envelope in a fully distended position at all times during the towing operation by reason of the difference in pressure of the water within the envelope and the water adjacent thereto. The envelope is towed preferably near the surface of the water in a submerged condition and maintained at this predetermined depth of submergence by a float secured to the tow line at a point near the leading end of the envelope.

As the water-filled envelope is towed through the water, the water surrounding this envelope is displaced along certain streamlines determined by the shape of the body. As a result of this displacement, various portions of water adjacent the envelope acquire different velocities and these velocities cause a decrease in the pressure of the water at the points corresponding in accordance with the well known law of Bernoulli. The envelope is of sufficient length to apply a continuous decreased pressure at a fixed point of reference therebeneath for a period of time sufficient to cause a pressure operated mine arranged on the bed of a body of water to fire. Stated differently, the envelope is so shaped and is towed at such a speed as will effect the pressure time relations within the water required to sweep the mine.

One of the objects of the present invention is to provide an underwater sweep for a pressure mine which will simulate the pressure signature of a moving vessel.

Another object is to provide a device for simulating the pressure signature of a vessel which possesses the desirable qualities of hydrodynamic stability in operation.

Another object is to provide a device for sweeping a pressure mine which is easy to launch, expendable, inexpensive to manufacture, reliable in operation, and which possesses all of the qualities of durability and dependability in service.

Another object is to provide a sweep which is adapted to be transported by a vessel in a collapsed condition, and which may be quickly streamed and inflated with water within the vicinity of the mine field, by employing a small complement of personnel.

A further object is to provide a device for prematurely exploding a pressure mine in which the sweep is composed of pliable material and is adapted to withstand the explosion of the mine without substantial injury thereto.

A still further object is to provide a flexible structure adapted to tow a ponderous mass of water entrained therein and which will withstand the stresses induced therein by the towing operation.

Still another object is to provide an elongated flexible envelope adapted to entrain a ponderous mass of water therein as the envelope is towed through the water thereby to sweep a pressure fired mine, in which means are provided for quickly emptying the envelope at the conclusion of the sweep operations.

Still other objects, advantages and improvements will be apparent from the following description, taken in connection with the accompanying drawings, in which.

Figure 1:
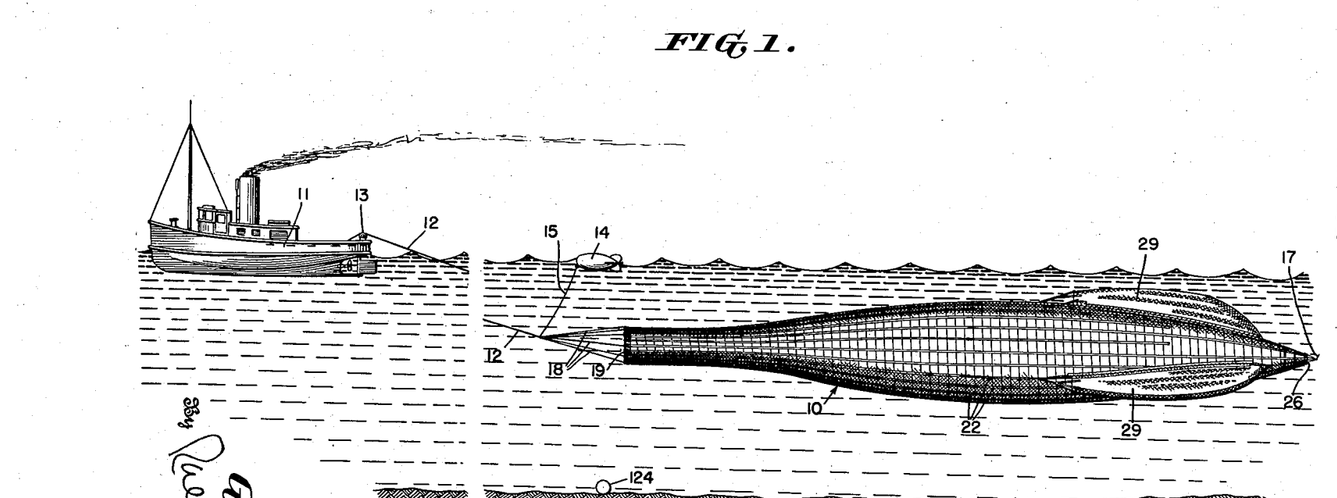
Fig. 1 is a view in elevation showing the device according to a preferred embodiment thereof being towed by a vessel.

Referring now to the drawings for a more complete understanding of the invention and more particularly to Fig. 1 thereof, there is shown thereon the device of the present invention according to a preferred embodiment thereof and indicated generally by the reference numeral 10 submerged within a body of water and towed by a vessel 11 having a line 12 secured thereto and to the leading end of the device. The line 12 preferably passes over a roller 13 arranged on the fantail of the vessel and connected at the distant end thereof with a float 14 by the line 15. The trailing end of the device is also provided with a float 16, connected thereto as by the line 17, the purpose of which will become more clearly apparent as the description proceeds. The line 12 is connected to a towing bridle comprising a plurality of flexible towing members 18 respectively connected at one end thereof to the tow line 12 and at the opposite end to a rigid annular member 19. The annular member is provided with a plurality of shackle bolts 20 secured thereto at regular intervals and having sleeves 21 thereon to which are respectively connected the webs 22 and 23 in such a manner that each of the webs 22 is intermediate a pair of webs 23 at the point of connection of the webs with the associated shackle bolts.

Figures 4, 5, 16, 17:
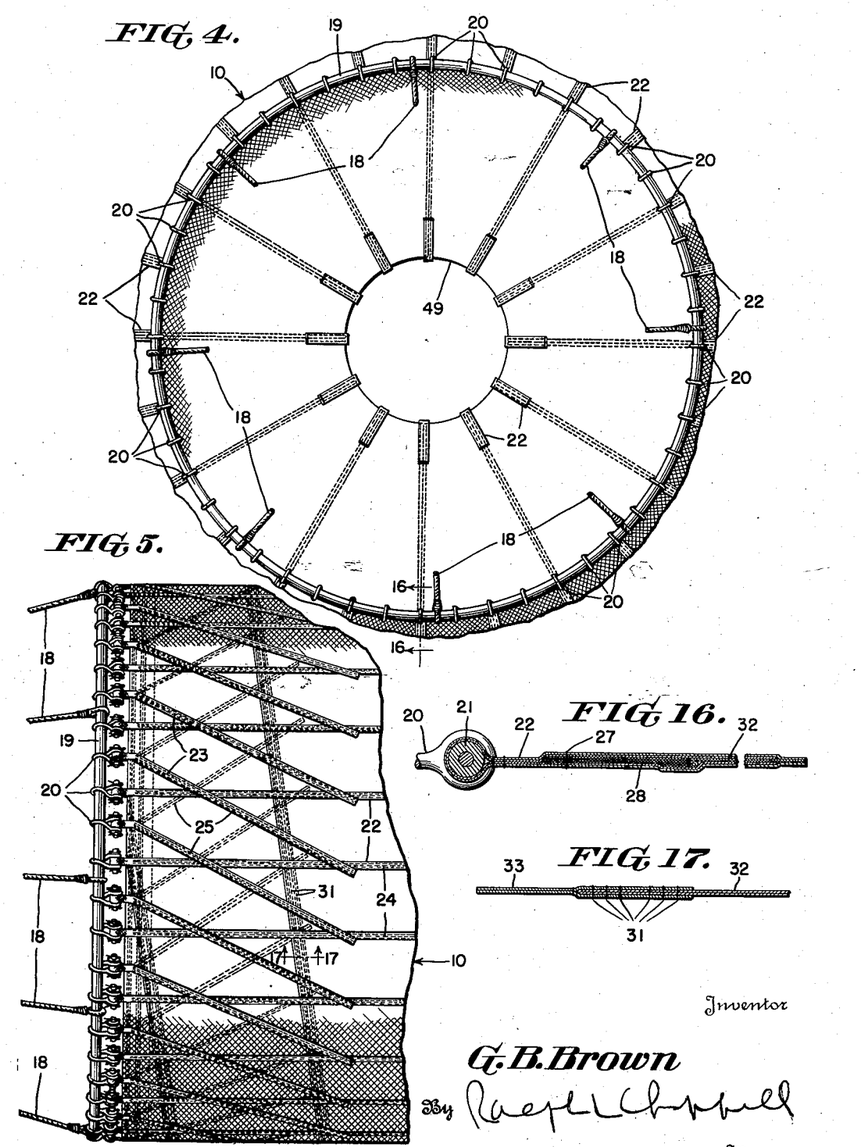
Fig. 4 is a greatly enlarged front end view partly broken away of the device of Fig. 1.
Fig. 5 is a fragmentary side view of the device of Fig. 4.
Fig. 16 is an enlarged view in section taken along the line 16—16 of Fig. 4.
Fig. 17 is an enlarged view in section taken along the line 17—17 of Fig. 5.

The webs 22 and 23 are stitched to the body of the device by a plurality of rows of stitches 24 and 25 respectively, Fig. 5, in such a manner that the webs 22 are arranged longitudinally with respect to the body of the device and the webs 23 are arranged at an angle with respect to the webs 22, the webs being additionally secured to the leading end of the body by an additional row of stitching 27, Fig. 16, passing through the hem portion 28 of the body. The webs 22 and 23 are employed to distribute the towing force throughout the area of the body of the device whereby the throat of the device comprising a ring 19 and body adjacent thereto is prevented from being torn away from the remainder of the body by the towing force applied thereto by the line 12 as the device is towed through the water.

Figure 2:
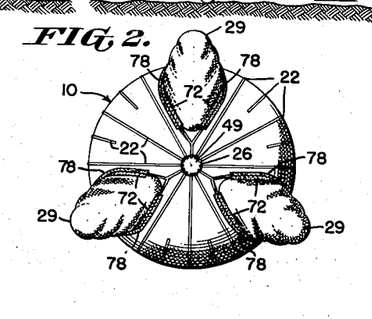
Fig. 2 is a somewhat enlarged rear view of the device of Fig. 1 with the float and line removed.
Figure 3:
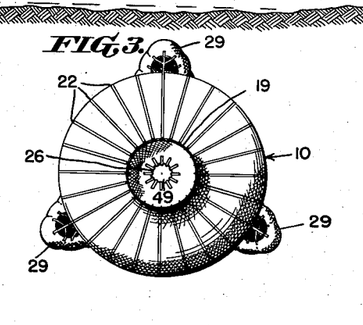
Fig. 3 is a somewhat enlarged front view of the device of Fig. 1.

As clearly shown on Figs. 1, 2, and 3 the device 10 is generally circular in shape and elongated sufficiently to facilitate towing of the device through the water and to provide a structure which is adapted to maintain a condition of reduced pressure at a fixed point of reference therebeneath for a predetermined period of time as the device is towed past the point of reference. The device is provided with a ring member 26 secured at the trailing end thereof of lesser diameter than the ring 19 whereby the device is adapted to be filled continuously with water at a pressure slightly in excess of the pressure of the surrounding water as the device is towed therethrough by reason of the differential in the size of the rings 19 and 26. The ring 26, it will be noted, is preferably connected by the line 17 to the float 16, the float being generally similar to the float 14 thereby providing means whereby the trailing end of the device may be easily recovered when it is desired to stow the device on the vessel at the completion of the sweeping operations.

Hydrodynamic stability is obtained by a cylindrically shaped throat portion of the body and a plurality of fin members 39 secured to the aft portion of the body, each of the fins being of hollow construction and adapted to be distended by the pressure of the water admitted thereto through an opening in the leading end of each of the fins respectively.

The general construction of the body and the fins of the device and the manner of securing the fins to the body will now be described.

Figure 18:
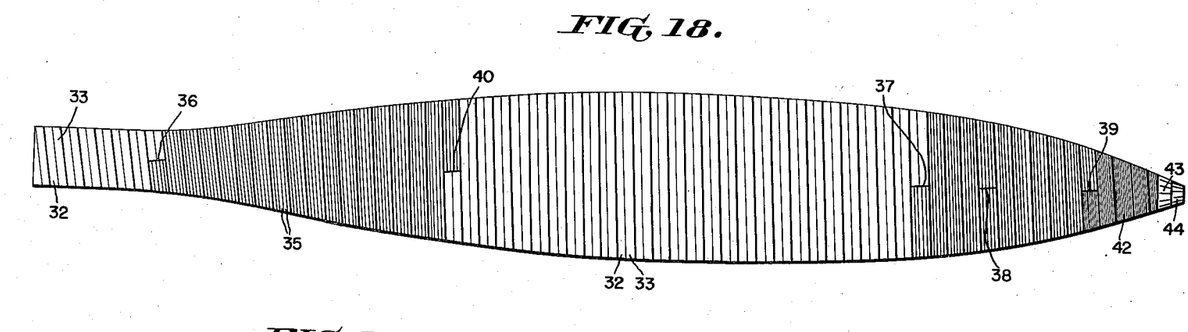
Fig. 18 is a view of the envelope before the fins are attached, showing certain details of the envelope structure.
Figures 19, 20:
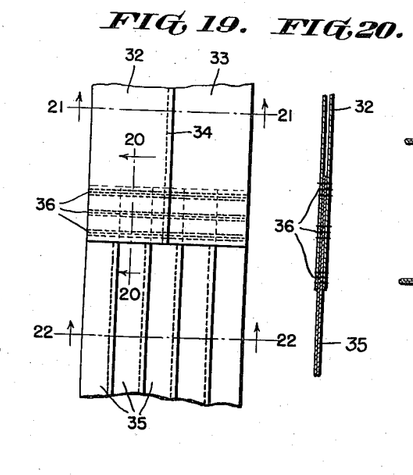
Fig. 19 is a detail view showing the method of attaching two-ply material to five-ply material at certain points in the main body structure.
Fig. 20 is a sectional view taken along the line 20—20 of Fig. 19.

The body and fins of the device are composed of fabric suitable for the purpose such, for example, as a fabric known in the art as nylon. As best shown on Fig. 18 the leading end of the body is composed of a length of fabric, nylon having been found satisfactory for this purpose. This length of material is composed of two strips 32 and 33 stitched together with six rows of stitching indicated generally by the dashed line 34, Fig. 19. Each of the strips 32 and 33 is folded double, the folded portion of the strip 33 being arranged between a pair of edge portions of the strip 32 and stitched thereto by the stitching 34, Fig. 21. This two-ply length of material is stitched together at 31, Fig. 17, to form a helical fabric structure of double pitch comprising the cylindrically shaped throat of the body. Stitched to the end of the strips 32—33 is a length of nylon fabric comprising five elongated folded portions 35 stitched thereto as by the rows of stitching 36, Figs. 19 and 20. The leading tapered portion of the body is thrus composed of a length of fabric of quintuple pitch, the type of fabric known as nylon having been found suitable for the purpose. Successive convolutions of the strip of type 3A material, it will be understood, are stitched together by six of stitching similar to the arrangement employed in securing the successive convolutions of the length of material comprising the throat of the body.

The central portion of the body is composed of a length of material comprising two elongated pieces of nylon fabric 32 and 33 stitched together in a manner similar to the arrangement employed in the construction of the throat of the body whereby the central portion of the body is composed of a strip of material helically wound on a double pitch, the junction 40 of the material composing the central portion of the body with the material composing the aforesaid helical portion of the body being generally similar to the junction of the material composing the tapered portion of the body with the material comprising the throat.

The tapered trailing portion of the body is composed of five strips of nylon fabric stitched to the central body portion at 37 by a plurality of rows of stitching. This length of material is stitched at 38 to five strips or plies of material known as nylon fabric.

Figures 21, 22, 23:
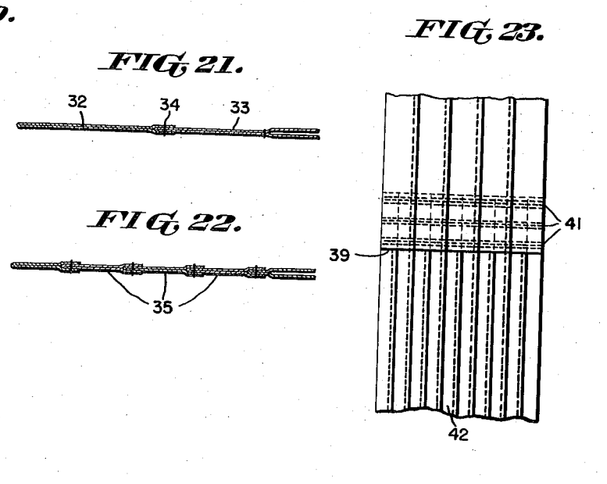
Fig. 21 is a sectional view taken along the line 21—21 of Fig. 19.
Fig. 22 is a view taken along the line 22—22 of Fig. 19.
Fig. 23 is a detail view showing the method of attaching 5-ply material to 10-ply material at certain points in the main body structure.

The nylon fabric is stitched together thereby to form a tapered circular structure in quintuple pitch, one end of the fabric being stitched at 39 by a plurality of rows of stitching 41, Fig. 23, to a length of fabric 42 of ten ply construction, thereby providing a ten pitch circular tapering and trailing tail portion of the body.

Figure 24:
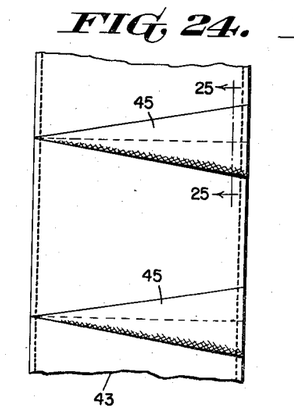
Fig. 24 is a detail view showing the method of reducing the diameter of the envelope rapidly at the rear end of the main body.
Figures 25, 26:
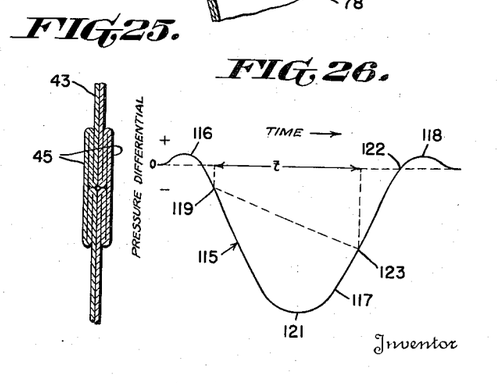
Fig. 25 is a view in section taken along the line 25—25 of Fig. 24.
Fig. 26 shows in diagrammatic form the relation between the pressure differential of the surrounding water and time as the sweep device passes above a fixed point of reference.

The trailing end portion of the body comprises two lengths of nylon fabric material designated 43 and 44 respectively, each of the lengths 43 and 44 having a plurality of uniformly spaced gores 45 formed thereon by folding the material back on itself, as best shown on Figs. 24 and 25, sufficiently to provide a smooth tapering outline to the body when the lengths of material 43 and 44 are stitched thereto.

The juncture of the tapered portion 43 with the ten pitch material is made secure by a length of tape or webbing 46 stitched along the junction of these parts and, in like manner, the tapered portion 44 is made secure to the tapered portion 43 by a length of tape 47 stitched thereto. The opposite end of the tapered member 44 is stitched to a length of tape 48 thereby forming an aperture 49 through which a relatively small quantity of water is continuously discharged while the device is being towed through the water in a fully inflated condition. From the foregoing it will be apparent that the body of the device is composed of fabric material of double thickness and sufficient strength according to the desired shape of the body and the stresses to be withstood by the various portions of the body during the towing operation.

Figures 6, 7, 15:
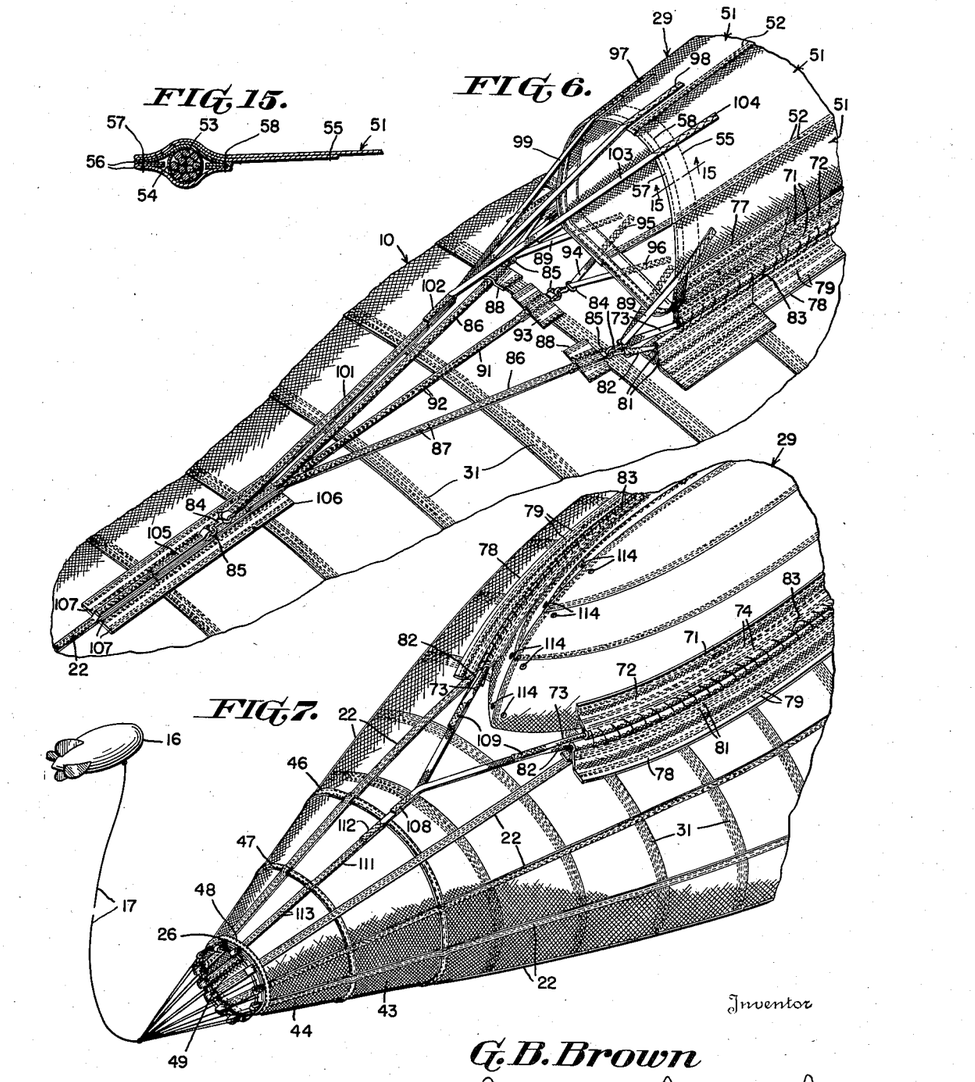
Fig. 6 is a view in perspective of the front end portion of one of the fins employed with the device and showing the method of attaching the fin to the main body of the device.
Fig. 7 is a view in perspective of the tail end of the fin of Fig. 6 and showing a portion of the main body.
Fig. 15 is an enlarged view in section taken along the line 15—15 of Fig. 6.

The webs 22 extend rearwardly along the length of the body and are stitched thereto, throughout the length, thereby to distribute the towing pressure uniformly throughout the envelope comprising the body in accordance with the stresses applied thereto by the surrounding water and the water entrained therein, alternate ones of the webs 22 extending throughout the entire length of the body and passing over the tapes 46 and 47 and intermediate the tape 42 and the body portion 44, the ends of these tapes being formed in loops within which is arranged the ring 26, Figs. 1, 2 and 7.

The construction of the fins and the manner of attaching the fins to the body will now be described, with particular reference to Figs. 6 through 15.

The body of each of the fins is composed of nylon fabric and comprises a plurality of gore sections indicated generally by the numeral 51 and stitched together by a plurality of rows of stitching 52 thereby to give the fins the general appearance as shown on Figs. 1, 2 and 3 when attached to the main body of the device and towed through the water by a vessel. The leading end of each of the fins is secured to a hoop 53 composed preferably of a continuous length of wire suitable for the purpose such, for example, as piano wire formed into a hoop with each convolution of the wire in contiguous relation with the remaining convolutions thereof and maintained in such relation by a wrapping of tape 54 thereabout. The leading end of the fin may be secured to the hoop in any convenient manner as for example by folding the leading end of the gore sections 51 inwardly and stitching the selvage portion thereof to the gore sections as at 55. The hoop 53 is enclosed between a pair of web sections 56, Fig. 15, having the edge portions thereof folded inwardly and stitched to the gore sections 51 as at 57 and 58 respectively.

Figure 8:
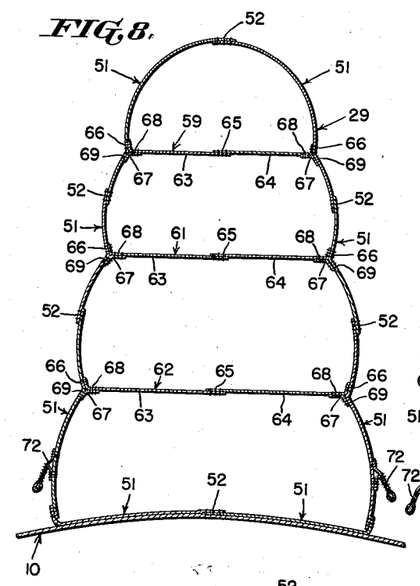
Figs. 8, 9 and 10 are enlarged sectional views taken along the lines 8—8, 9—9 and 10—10 respectively, of Fig. 12.
Figure 9:
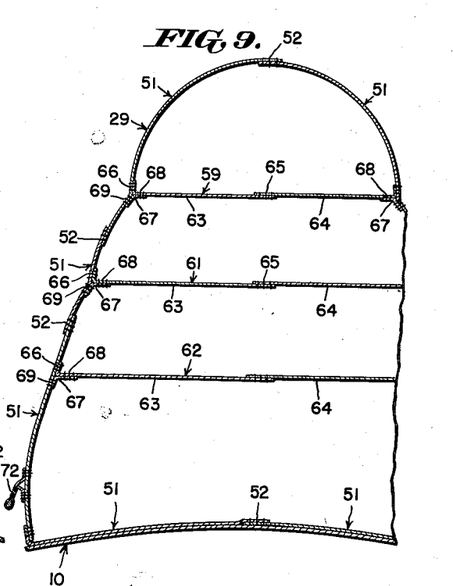
Figures 10, 11:
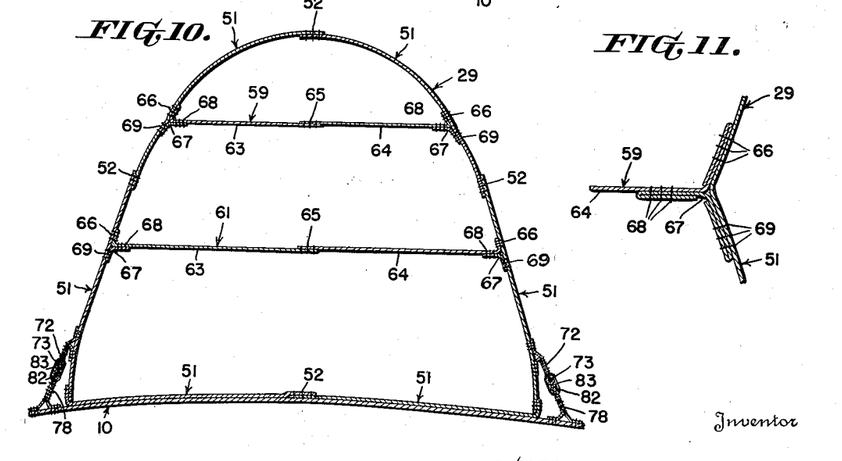
Fig. 11 is a view in section showing the preferred method of joining three pieces of fabric at a common line of intersection.
Figure 12:
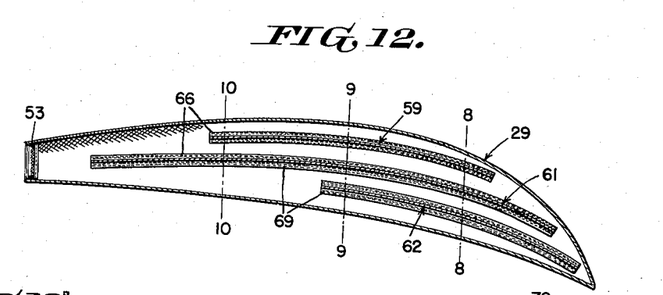
Fig. 12 is a longitudinal cross section of the fin structure.
Figure 13:
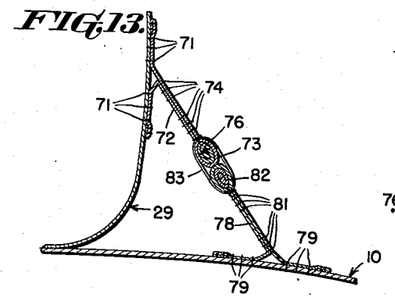
Fig. 13 is a view in section showing details of the fin structure by which the fins are attached to the body.
Figure 14:
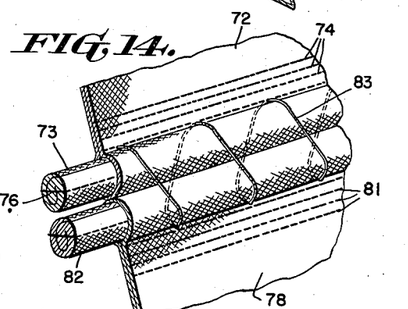
Fig. 14 is a view in perspective showing the method of attaching a fin tab to a body tab.

There is also provided within each of the fins a plurality of flexible tension members indicated generally by the reference numerals 59, 61 and 62 respectively, Figs. 8, 9 and 12. The tension member 59 is composed of two gore sections of nylon fabric 63 and 64 stitched together at 65. The manner of securing the tension member 59 to the fin 29 is best shown on Fig. 11 in which the outward edge of the reinforced member is folded back on itself and secured to the inner wall of the fin 29 by a plurality of rows of stitching 66. The reinforced member 59 is additionally secured to the fin by the reinforcing strip of nylon fabric 67 stitched to the tension member 59 and to the fin 29 as at 68 and 69 respectively.

The tension members 61 and 62 are generally similar to the tension member 59, each of the members being composed of two gore strips of nylon stitched together and secured to the fin 29 generally in the manner of the tension member 59.

The fin has also secured thereto as by the rows of stitching 71, a tab 72 comprising a length of nylon fabric having a cord 73 extending throughout the length of the tab and confined therein by the rows of stitching 74. The cord 73 is preferably formed from a length of nylon fabric rolled upon itself and maintained in the rolled condition by the stitching 76, Figs. 13 and 14. The leading end of the nylon strip 72 is reinforced by a length of nylon fabric 77 stitched exteriorly thereto and to the fin 29 by a plurality of rows of stitching, Fig. 6.

A complementary tab 78 comprising a length of nylon fabric is stitched to the body of the device by a plurality of rows of stitching 79 and stitched together at 81 to form a loop portion extending throughout the length of the strip within which is arranged a line or cord 82 constructed similar to the line 73. The fin is secured to the body of the device by a continuous lashing comprising the cord 83 wrapped or stitched about the loops formed in the tabs 72 and 78 enclosing the lines 73 and 82 respectively. The leading end of each of the lines 73 and 82 is connected to a snap fastener 84 in engagement with an eye member 85 secured to a tape 86 stitched to the body of the device by rows of stitching 87 and reinforced by a patch 88 stitched to the body of the device. The eye member 85 is also engaged by a snap fastener secured to a length of web or tape 89 stitched to the fin at the end portions thereof, Fig. 6. It will be understood that the tapes 86 are provided in duplicate for each of the fins and are employed for applying a towing force to the lines 73 and 82 and to the web 89.

There is also provided a tape 91 stitched to the body of the device as at 92 and having an eye member 85 secured thereto, the tape 91 being additionally secured to the body of the device by a patch 93 stitched thereto. Secured to the tape 91 is a snap fastener 84 having a length of web or tape 94 engaged therewith, the end portions of the tape being stitched to the fin as at 95 and 96 respectively, Fig. 6. Stitched to the web 89 by stitching 97 and 98 respectively is a length of web 99 looped through a fastener 85, the web 99 being stitched together along the length thereof as at 101 and stitched at 102 to a web 103 secured to the opposite end thereof to the fin 29 by stitching 104. The tapes or webs 86, 91 and 99 are secured to a web 22 by a plurality of rows of stitching and to the eye member 85 in engagement with the length of web 105, the various webs and tapes exclusive of the web 99 being stitched to the body of the device and to a patch 106 arranged intermediate the various webs and the body of the device and stitched thereto by stitching 107, the arrangement of the tapes 86, 91, 99, 101, 94, 89, 99 and 103 comprising a harness adapted to tow the fin through the water with the aperture formed within the hoop 53 disposed in a plane substantially normal to the direction of travel of the device through the water.

The trailing end of the lines 82 are stitched together and to the body of the device as at 108 and the lines 73 are stitched to the lines 82 respectively and to the body of the device as at 109. One of the lines 82 is stitched to a length of tape 111 and to the body of the device as at 112, the tape 111 being additionally stitched to the body of the device by a plurality of rows of stitching 113 and formed in a loop at the trailing end thereof within which is arranged the ring member 26. Within the rear portion of each of the fins are arranged a plurality of eyelets 114 thereby to provide an escape for the air trapped within the fins as the fins and the device are filled with water during the launching operation. The eyelets are sufficiently small to maintain a predetermined pressure within the fin as the device is towed through the water thereby to maintain the fins sufficiently rigid to impart dynamic stability to the structure.

The method of launching the device and the operation of the device as a mechanism for sweeping a pressure mine will now be described. Let it be assumed, by way of example, that the fins 29 are attached to the main body portion of the device and the floats 14 and 16 have been secured by the lines 15 and 17 to the tow line 12 and to the ring 26 of the device respectively. The device and the floats are now lowered into the water from the vessel 11. When the slack in the tow line 12 has been taken up, the annular member 19 is dragged through the water by the towing members 18 in such a manner that water is forced into the throat of the body as the member 19 is hauled forward by the vessel. The body of the device is thus caused to fill with water as the towing operation proceeds, any air which may have been trapped therein escaping through the ring 27 at the tail of the body, and the body assumes a semi-rigid condition by reason of the ponderous mass of water entrained therein. Concurrently therewith the fins are filled with water flowing through the hoops 53 respectively secured thereto, the trapped air within the fins escaping through the eyelets 114 located at the rear portion of the fins. The fins are thus caused to assume a semi-rigid condition during the dilation of the body of the device and thereby impart hydrodynamic stability thereto.

As shown on Fig. 1 the device is towed beneath the surface of a body of water by a vessel at a predetermined depth of submersion controlled by the float 14 and the length of line 15 secured thereto with a ponderous mass of water entrained therein. As the device passes over a fixed point of reference at the bed of the body of water beneath the device the degree of pressure at the reference point is changed, the pressure first being slightly increased, and then decreased below the normal hydrostatic pressure at the point of reference as the device passes over the point of reference in accordance with the well known law of Bernoulli's theorem, the pressure increasing by a small amount above the normal pressure as the tail of the device passes over the reference point. This condition is shown graphically on Fig. 26 by the curve 115 in which the slight increase in the pressure is indicated by the portion 116, the decrease in pressure by the portion 117 and the slight increase in pressure as the tail of the device passes over the point of reference by the portion 118 of the curve.

Let it now be assumed that a pressure fired mine 124 is arranged at the aforesaid point of reference, Fig. 1. As the forward end of the device passes over the mine the decrease in pressure of the water at the mine is sufficient to actuate the mine firing control mechanism, the device having moved to a position corresponding to a decrease in pressure indicated by the point 119 on the pressure curve 115. It is the usual practice to arrange the firing control mechanism for pressure mines in such a manner that a predetermined reduction in hydrostatic pressure is required to be continuously maintained or exceeded for a period of time in excess of the reduction in pressure at the mine caused by waves in order to fire the mine and to prevent the mine from being prematurely fired by wave action and, furthermore, this reduction in pressure of the surrounding water at the mine must be effected at a rate in excess of the reduction in pressure caused by tides to prevent the mine from being fired prematurely by tide action. It will be noted that the pressure at the point 119 of the curve 115 is decreasing at a relatively rapid rate, the pressure continuing to decrease as the device moves across the mine until the point 121 of the curve is reached, the pressure thereafter increasing until the pressure equals the static head of water at 122 and continuing to increase slightly thereafter until the point 118 of the curve is reached. In order to fire the mine 124, the mine firing control mechanism of the mine is required to be continuously controlled by a decrease in water pressure for a time $t$, Fig. 26, during which time the hydrostatic pressure at the mine does not rise above the pressure required to actuate the firing control mechanism. At the expiration of time $t$, it will be noted, the pressure has been decreased to a value in excess of the pressure required to actuate the mine firing mechanism initially and at no time during this interval is the pressure increased to a value equal to or higher than the pressure required to maintain the mine firing mechanism actuated. The mine, therefore, is fired at the expiration of the time $t$ when the device has moved across the mine to a position corresponding to the point 123 of the curve 115.

When this occurs, the tail portion of the sweep mechanism is blown upwardly by the force of the explosion of the mine without sustaining serious damage thereto by reason of the flexible character of the body structure of the device.

In the event, however, that the device should be destroyed or damaged to a considerable extent by the force of the explosion of a mine in which the time $t$ is sufficiently short to cause the mine to explode beneath the central portion of the envelope, a new device may be lowered into the water and the sweeping operations resumed within a few minutes after the damage is sustained.

When it is desired to stow the sweeping device on the vessel at the completion of a sweeping operation, the float 16 is hauled aboard the vessel and the device is brought aboard tail first, using the roller 13 whereby the water entrained within the device is emptied through the ring 19 as the device is hauled aboard.

Whereas the invention has been described with particularity with reference to a specific structure, it will be understood that the invention is not so limited as by suitably proportioning the body structure the pressure-time relation at a fixed point of reference therebeneath can be made to resemble the pressure-time relation which occurs as a result of the passage of a ship as closely as is desired.

Briefly stated in summary, the present invention contemplates the provision of an elongated flexible body for entraining a ponderous mass of water which may be compactly stowed aboard a vessel and easily launched therefrom and which possesses the desired qualities of hydrodynamic stability, ease of towing, and which is adapted to produce a relatively rapid reduction in the pressure of the water at a fixed reference point on the bed of the body of water as the device is towed thereacross, which will maintain this condition of decreased pressure at the reference point for a predetermined period of time without permitting the pressure to rise above a predetermined value of decreased pressure meanwhile, and which possesses the desired quality of expendability in the event of destruction or damage thereto by the exploding mine.

While the invention has been described with reference to a particular example which gives satisfactory results, it will be understood by those skilled in the art to which the invention appertains, after understanding the invention, that various changes and modifications may be made without departing from the spirit and scope of the invention and it is my intention therefore in the appended claims to cover all such changes and modifications.

The invention herein described may be manufactured and used by or for the Government of the United States of America for governmental purposes without the payment of any royalties thereon or therefor.

What is claimed as new and desired to be secured by Letters Patent of the United States is:

1. A device of the character disclosed for sweeping a pressure mine and comprising an elongated flexible tapered body having an aperture in one end thereof through which water is adapted to flow as the device is towed through the water, an annular member secured to said body at the leading end thereof and surrounding said aperture, means including a line secured to said annular member for towing the body through the water, a float connected to said tow line for controlling the depth of submergence of the body within the water, and a plurality of fins secured to said body for imparting hydrostatic stability thereto as the device is towed by said line.

2. A device for sweeping a pressure fired mine comprising an elongated flexible envelope for entraining a ponderous mass of water as the envelope is towed through the water, a towing connection for said envelope, a plurality of flexible fin members secured to the aft portion of said envelope and inflated with water during movement therethrough sufficiently to cause the fins to be effective in imparting hydrodynamic stability to the envelope, and means for causing the fins to be inflated with water independently of the inflated condition of the envelope as the envelope is towed therethrough.

3. A device for sweeping a pressure fired mine comprising an elongated flexible envelope adapted to entrain a ponderous mass of water as the envelope is towed through the water, a towing connection for said envelope, a plurality of flexible fin members secured to the aft portion of said envelope and adapted to be inflated with water sufficiently to cause the fins to be effective in imparting hydrodynamic stability to the envelope, means for causing the fins to be inflated with water as the envelope is towed therethrough, means on said fins for causing the release of air trapped within the fins while the fins are being filled with water, and means on said envelope for permitting the escape of air trapped therein as the envelope is filled with water.

4. In a device of the character disclosed for sweeping a mine, in combination, an elongated flexible envelope composed of woven fabric and adapted to entrain a ponderous mass of water therein, means for towing said envelope at a predetermined depth of submersion within the water, a plurality of fins secured to the aft portion of the envelope, each of said fins being composed of woven fabric and adapted to be inflated by hydrostatic pressure as the envelope is towed through the water, and a plurality of flexible tension members disposed within each of said fins, each of said tension members being composed of woven fabric and secured to opposite sides of each of the fins thereby to increase the effectiveness of the fins in imparting hydrodynamic stability to the envelope.

5. In a mine sweeping device comprising an elongated tapered envelope composed of woven fabric and adapted to entrain a ponderous mass of water therein, a towing connection for said envelope, means for maintaining a predetermined degree of hydrostatic pressure on said entrained water while the envelope is towed, a plurality of fins composed of woven fabric and having a plurality of apertures respectively arranged therein whereby the fins are adapted to be inflated by hydrostatic pressure while the envelope is towed through the water, means including a pair of lashings for securing each of said fins to the aft portion of said envelope, and a harness comprising a plurality of elongated flexible members composed of woven fabric and connected to the envelope and to the fins adjacent said apertures therein for maintaining the fins continuously inflated as the envelope is towed through the water.

6. A sweep device for a pressure mine comprising a flexible elongated tapered envelope adapted to entrain a ponderous mass of water therein, said envelope having a main body portion and a throat portion, a rigid annular member secured to said throat portion and having an aperture therein adapted to permit a flow of water into the envelope, a plurality of elongated tension members secured to said throat and main body portions for additionally securing said annular member to said envelope, a bridle comprising a plurality of flexible tension members secured to said annular member and adapted to tow the envelope through the water with said annular member substantially normal to the direction of travel thereof, means including a tow line connected to said bridle for applying a towing force to said envelope, and a float connected to said tow line by a length of line for controlling the depth of submersion of said sweep device as the envelope is towed through the water.

7. A sweep device for a pressure mine comprising a flexible elongated tapered envelope adapted to entrain a ponderous mass of water therein, said envelope having a main body portion and a throat portion, a rigid annular member secured to said throat portion and having an aperture therein adapted to permit a flow of water into the envelope, a plurality of elongated tension members secured to said throat and main body portions for additionally securing said annular member to said envelope, means for further securing said annular member to the envelope and adapted to distribute the towing stresses therebetween uniformly about the periphery of said aperture, a bridle comprising a plurality of flexible tension members secured to said annular member and adapted to tow the envelope through the water with said annular member substantially normal to the direction of travel thereof, means including a tow line connected to said bridle for applying a towing force to said envelope, and a float connected to said tow line by a length of line for controlling the depth of submersion of said sweep device as the envelope is towed through the water.

8. A sweep device for a pressure mine comprising a flexible elongated tapered envelope for entraining a ponderous mass of water therein, said envelope having an enlarged main body portion and a reduced throat portion at the leading end thereof, a rigid annular member secured to said throat portion and having an aperture therein for flow of water into the envelope, means including a plurality of elongated strap members for securing said annular member to the envelope and distributing the towing stresses therebetween uniformly about the periphery of said aperture and throughout the length of the envelope, a bridle comprising a plurality of flexible tension members secured to said annular member for towing of the envelope through the water with said annular member substantially normal to the direction of travel thereof, means including a tow line connected to said bridle for applying a towing force to said envelope, and a float connected to said tow line by a length of line for controlling the depth of submersion of said sweep device as the envelope is towed through the water.

9. In a device for sweeping a pressure mine, in combination, a circular elongated tapered flexible envelope adapted to entrain a ponderous mass of water therein and having a throat portion with a circular aperture at the leading end thereof and a second circular aperture of lesser size at the trailing end of the envelope, said envelope being composed of a plurality of lengths of fabric material having the characteristic of nylon, towing means for said envelope including a rigid annular member encircling said first named aperture, means including a plurality of elongated flexible tension members stitched to the envelope for establishing a towing connection between the annular member and the envelope, said elongated members comprising a first group of tension members secured to said annular member at regular intervals along the periphery thereof and stitched to said envelope throughout the length thereof, and a second group of members secured to said annular member at regular intervals along the periphery thereof and intermediate the connections of said first group of members with said annular member, said second group of members being stitched to said throat portion of the envelope.

10. In a device of the character disclosed for sweeping a pressure mine, the combination of an elongated tapered flexible envelope adapted to entrain a ponderous mass of water therein, said envelope having an aperture in the leading end and a smaller aperture in the trailing end thereof, a rigid annular member secured to the leading end of said envelope and encircling said first named aperture, a second rigid annular member secured to the trailing end of said envelope and encircling said smaller aperture, said second annular member being of lesser size than the first named annular member, means including a line secured to the first named annular member for towing the envelope and entrained water at a predetermined depth of submersion, and a plurality of elongated flexible members stitched to said envelope along the length thereof and having the ends of each of said members secured to the leading one of said annular members thereby to distribute the towing force throughout the envelope.

11. In a device of the character disclosed, the combination of an elongated flexible body for entraining a ponderous mass of water therein as the device is towed through the water, and a plurality of radially disposed hydraulically inflatable stabilizing fin means secured to the body exteriorly thereof and having means individual thereto for directly entraining the surrounding water therein during movement therethrough and independently of the inflated condition of said body.

References Cited in the file of this patent

UNITED STATES PATENTS

| | | |
|---|---|---|
| 378,171 | McCarthy | Feb. 21, 1888 |
| 637,142 | Miller | Nov. 14, 1899 |
| 717,890 | Miller | Jan. 6, 1903 |
| 1,960,846 | Hein | May 29, 1934 |